United States Patent
Gongate

(10) Patent No.: US 11,485,198 B2
(45) Date of Patent: Nov. 1, 2022

(54) GENERATORS FOR TRANSPORT REFRIGERATION SYSTEMS

(71) Applicant: CARRIER CORPORATION, Palm Beach Gardens, FL (US)

(72) Inventor: Suzankumar Gongate, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/972,378

(22) PCT Filed: Nov. 19, 2019

(86) PCT No.: PCT/US2019/062153
§ 371 (c)(1),
(2) Date: Dec. 4, 2020

(87) PCT Pub. No.: WO2020/117467
PCT Pub. Date: Jun. 11, 2020

(65) Prior Publication Data
US 2021/0283993 A1    Sep. 16, 2021

(30) Foreign Application Priority Data
Dec. 7, 2018 (IN) .............................. 201811046277

(51) Int. Cl.
*B60H 1/32* (2006.01)
*H02K 35/02* (2006.01)
(Continued)

(52) U.S. Cl.
CPC .......... *B60H 1/3232* (2013.01); *B60K 25/08* (2013.01); *H02K 7/1869* (2013.01); *H02K 35/02* (2013.01); *B60Y 2200/147* (2013.01); *Y02T 10/90* (2013.01)

(58) Field of Classification Search
CPC ...... H02K 7/1869; H02K 7/18; H02K 7/1815; H02K 7/1876; H02K 7/1884; H02K 35/02;
(Continued)

(56) References Cited

U.S. PATENT DOCUMENTS 4,179,631 A    12/1979 Funderburg
4,500,827 A    2/1985 Merritt et al.
(Continued)

FOREIGN PATENT DOCUMENTS

CN    104908586 A    9/2015
CN    206399073 U  *  8/2017
(Continued)

OTHER PUBLICATIONS

Machine translation of CN-206399073-U. (Year: 2017).*
(Continued)

*Primary Examiner* — Michael Andrews
(74) *Attorney, Agent, or Firm* — Cantor Colburn LLP

(57) ABSTRACT

A transportation refrigeration system (100, 200, 300) includes a refrigeration system component (110), a linear generator (104, 202, 310) electrically connected to the refrigeration system component (110), and a linkage (142, 214). The linkage (142, 214) is operably connected to the linear generator (104, 202, 310) to convert movement of the transportation refrigeration system (100, 200, 300) into electrical power for communication to the refrigeration system component (110). An electric transportation refrigeration system used to cool a trailer box are also described.

20 Claims, 5 Drawing Sheets

(51) Int. Cl.
*H02K 7/18* (2006.01)
*B60K 25/08* (2006.01)
(58) Field of Classification Search
CPC ...... H02K 35/00; B60H 1/3232; B60K 25/08; B60Y 2200/147; Y02T 10/90
USPC .............................. 310/10, 12.14, 23, 30, 34
See application file for complete search history.

(56) References Cited

U.S. PATENT DOCUMENTS

| | | | |
|---|---|---|---|
| 5,921,334 A | 7/1999 | Al-Dokhi | |
| 6,952,060 B2 | 10/2005 | Goldner et al. | |
| 7,514,803 B2 | 4/2009 | Wilks | |
| 7,547,980 B2 | 6/2009 | Harrison | |
| 8,347,999 B2 | 1/2013 | Koelsch et al. | |
| 8,629,572 B1 | 1/2014 | Phillips | |
| 8,723,344 B1 | 5/2014 | Dierickx | |
| 8,935,933 B1 * | 1/2015 | Koelsch | B60H 1/00428 62/115 |
| 9,373,994 B2 | 6/2016 | Gialdella | |
| 9,590,473 B2 | 3/2017 | Liao et al. | |
| 9,707,844 B2 | 7/2017 | Arnold et al. | |
| 2008/0277939 A1 | 11/2008 | Richardson et al. | |
| 2010/0154449 A1 | 6/2010 | Stover, Jr. et al. | |
| 2010/0327600 A1 * | 12/2010 | Koelsch | B60L 8/003 320/101 |
| 2011/0084502 A1 | 4/2011 | Ghassemi et al. | |
| 2012/0133334 A1 | 5/2012 | Lachenmeier et al. | |
| 2012/0146339 A1 | 6/2012 | Lee | |
| 2012/0319472 A1 * | 12/2012 | Arnold | B60H 1/00428 307/9.1 |
| 2015/0214880 A1 * | 7/2015 | Gialdella | H02K 16/00 74/DIG. 9 |
| 2016/0129753 A1 * | 5/2016 | Koelsch | B60H 1/00264 62/235.1 |

FOREIGN PATENT DOCUMENTS

| | | |
|---|---|---|
| CN | 206399073 U | 8/2017 |
| DE | 102012016894 A1 | 2/2014 |
| DE | 102016215751 A1 | 3/2018 |
| EP | 2266831 A2 | 12/2010 |
| KR | 1020090027858 A | 3/2009 |

OTHER PUBLICATIONS

International Search Report issued in Application No. PCT/US2019/062153 dated Feb. 17, 2020, 7 pages.

Sultoni et al. "Vibration Energy Harvesting on Vehicle Suspension Using Rotary and Linear Electromagnetic Generator", IPTEK, The Journal for Technology and Science, vol. 24, No. 1, Apr. 2013, 6 Pages.

Written Opinion issued in Application No. PCT/US2019/062153 dated Feb. 17, 2020, 7 pages.

* cited by examiner

GENERATORS FOR TRANSPORT REFRIGERATION SYSTEMS

BACKGROUND

The embodiments described herein relate to transportation refrigeration systems, and more particularly to electric transportation refrigeration systems having linear generators for power refrigeration system components of the transportation refrigeration system.

Mobile refrigeration systems, such as on vehicles, commonly employ a diesel engine or a gasoline engine. The diesel engine or gasoline engine is used to drive various refrigeration system devices, like fans and compressors, which provide conditioning to a refrigerated space, typically through a mechanical or electrical scheme. Mechanical schemes apply mechanical power to the refrigeration system devices directly, such as through mechanical couplings and shafts, or indirectly, such as through of pulleys or V-belts. In electrical schemes the engine generally drives a generator to produce electrical power, which is turn provided to motors associated with the refrigeration system devices.

In both mechanical schemes and electrical schemes, the engine is typically co-located with the refrigeration system. Since operation of the engine entails generation of engine emissions operation of the refrigeration system generally requires release of the engine emissions into the immediate environment. Release of emissions into some environments can be undesirable under certain circumstances, such as in urban environments and in confined spaces, like tunnels and warehouses.

Such systems and methods have generally been considered suitable for their intended purpose. However, there remains a need for improved transportation refrigeration systems. The present disclosure provides a solution to this need.

BRIEF SUMMARY

A transportation refrigeration system includes a refrigeration system component, a linear generator electrically connected to the refrigeration system component, and a linkage. The linkage is linkage operably connected to the linear generator to convert movement of the transportation refrigeration system into electrical power for communication to the refrigeration system component.

In addition to the one or more features described above, or as an alternative, further embodiments may include a wheel supporting the transport refrigeration system, wherein the linkage is connected to the wheel to generate electrical power using rotation of the wheel.

In addition to the one or more features described above, or as an alternative, further embodiments may include wherein the wheel has an axle face and a road face, wherein the linkage is connected to the road face of the wheel.

In addition to the one or more features described above, or as an alternative, further embodiments may include wherein the linkage is connected to the road face of the wheel radially between a rotation axis of the axle and a circumference of the wheel.

In addition to the one or more features described above, or as an alternative, further embodiments may include wherein the transportation refrigeration system comprises one of a truck, a trailer, a railcar, and a shipping container.

In addition to the one or more features described above, or as an alternative, further embodiments may include wherein the linkage comprises a connecting link and a drive link.

In addition to the one or more features described above, or as an alternative, further embodiments may include wherein the drive link is connected between the linear generator and the connecting link.

In addition to the one or more features described above, or as an alternative, further embodiments may include wherein the connecting link is connected between the drive link and a wheel supporting the transportation refrigeration system.

In addition to the one or more features described above, or as an alternative, further embodiments may include wherein the linear generator includes a coil extending about a reciprocation axis and electrically connected to the refrigeration system component, and a permanent magnet disposed along the reciprocation axis and connected to the linkage for reciprocation along the magnet axis.

In addition to the one or more features described above, or as an alternative, further embodiments may include a battery electrically connected to the linear generator.

In addition to the one or more features described above, or as an alternative, further embodiments may include wherein the battery is carried by the transportation refrigeration system.

In addition to the one or more features described above, or as an alternative, further embodiments may include wherein the battery is carried by a prime mover coupled to the transportation refrigeration system.

In addition to the one or more features described above, or as an alternative, further embodiments may include a control circuit arranged to electrically connect linear generator to either or both the refrigeration system component and the battery.

In addition to the one or more features described above, or as an alternative, further embodiments may include a side guard carried by the transportation refrigeration system and laterally offset from the linear generator.

In addition to the one or more features described above, or as an alternative, further embodiments may include wherein the refrigeration system component comprises at least one of a compressor, an evaporator fan, and a condenser fan.

In addition to the one or more features described above, or as an alternative, further embodiments may include wherein linear generator is a first linear generator and further comprising a second linear generator electrically connected to the refrigeration system component.

In addition to the one or more features described above, or as an alternative, further embodiments may include wherein the first linear generator and the second linear generator are individually connected by separate linkages to a common axle.

In addition to the one or more features described above, or as an alternative, further embodiments may include wherein the first linear generator and the second linear generator are individually connected by separate linkages to separate axles.

In addition to the one or more features described above, or as an alternative, further embodiments may include wherein the transportation refrigeration system is engineless.

In accordance with certain embodiments, an electric transportation refrigeration system used to cool a trailer box can include a refrigeration system component, a linear generator electrically connected to the refrigeration system component, and a linkage. The linkage is linkage operably connected to the linear generator to convert movement of the transportation refrigeration system into electrical power for communication to the refrigeration system component. The linkage includes a connecting link and a drive link. The linear generator includes a coil extending about a reciprocation axis and electrically connected to the refrigeration system component, and a permanent magnet disposed along the reciprocation axis and connected to the drive link for reciprocation along the reciprocation axis. A wheel supports the transport refrigeration system and is connected to the linear generator by the connecting link to generate electrical power using rotation of the wheel. A battery is electrically connected to the linear generator and a truck side guard is carried by the transportation refrigeration and laterally offset from the linear generator. The transportation refrigeration system is engineless.

Technical effects of embodiments of the present disclosure include reduction of the amount of fossil fuel required for operating one or more transportation refrigeration component on a transportation refrigeration system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 1:
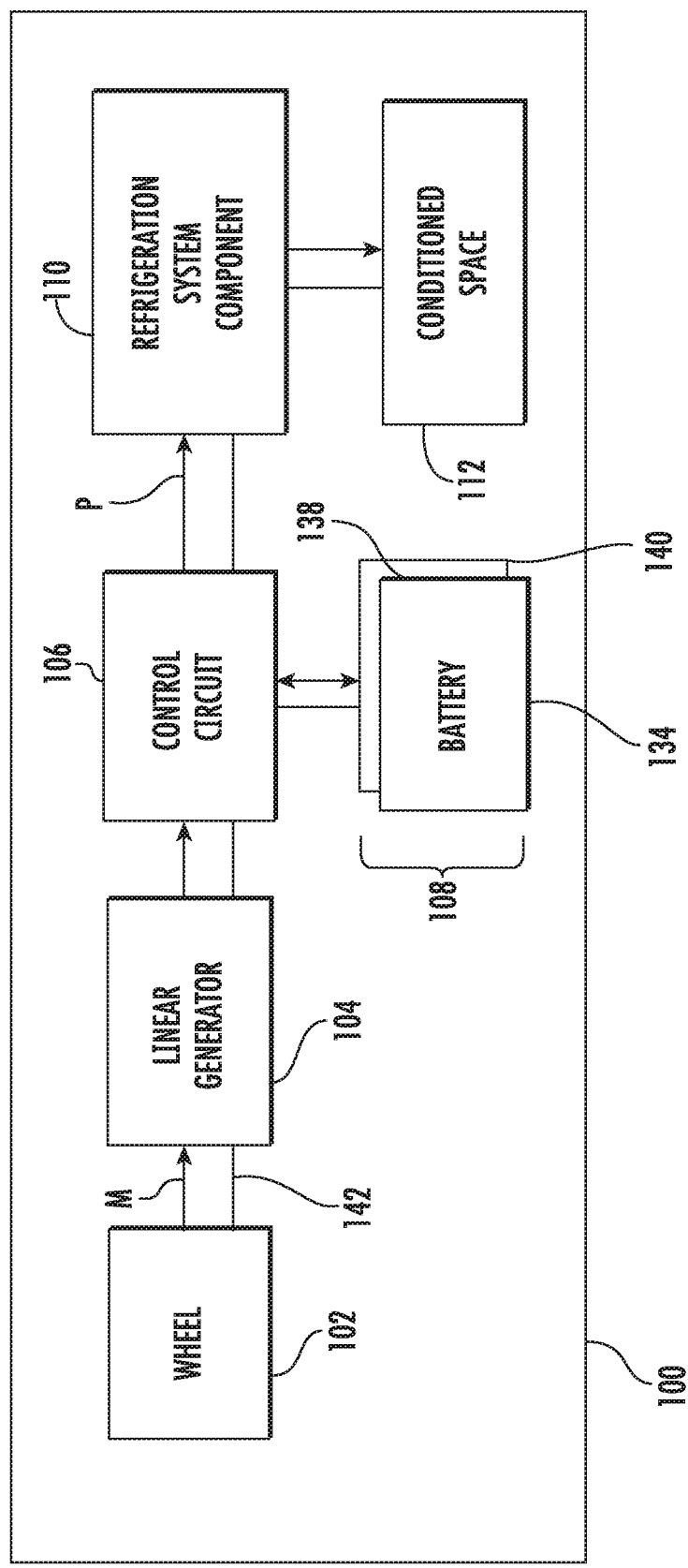
FIG. 1 is a schematic view of a transportation refrigeration system constructed in accordance with the present disclosure, showing a linear generator connected to a refrigeration system component by a linkage to convert movement of the transport refrigeration system into electrical power for a refrigeration system component.
Figure 4:
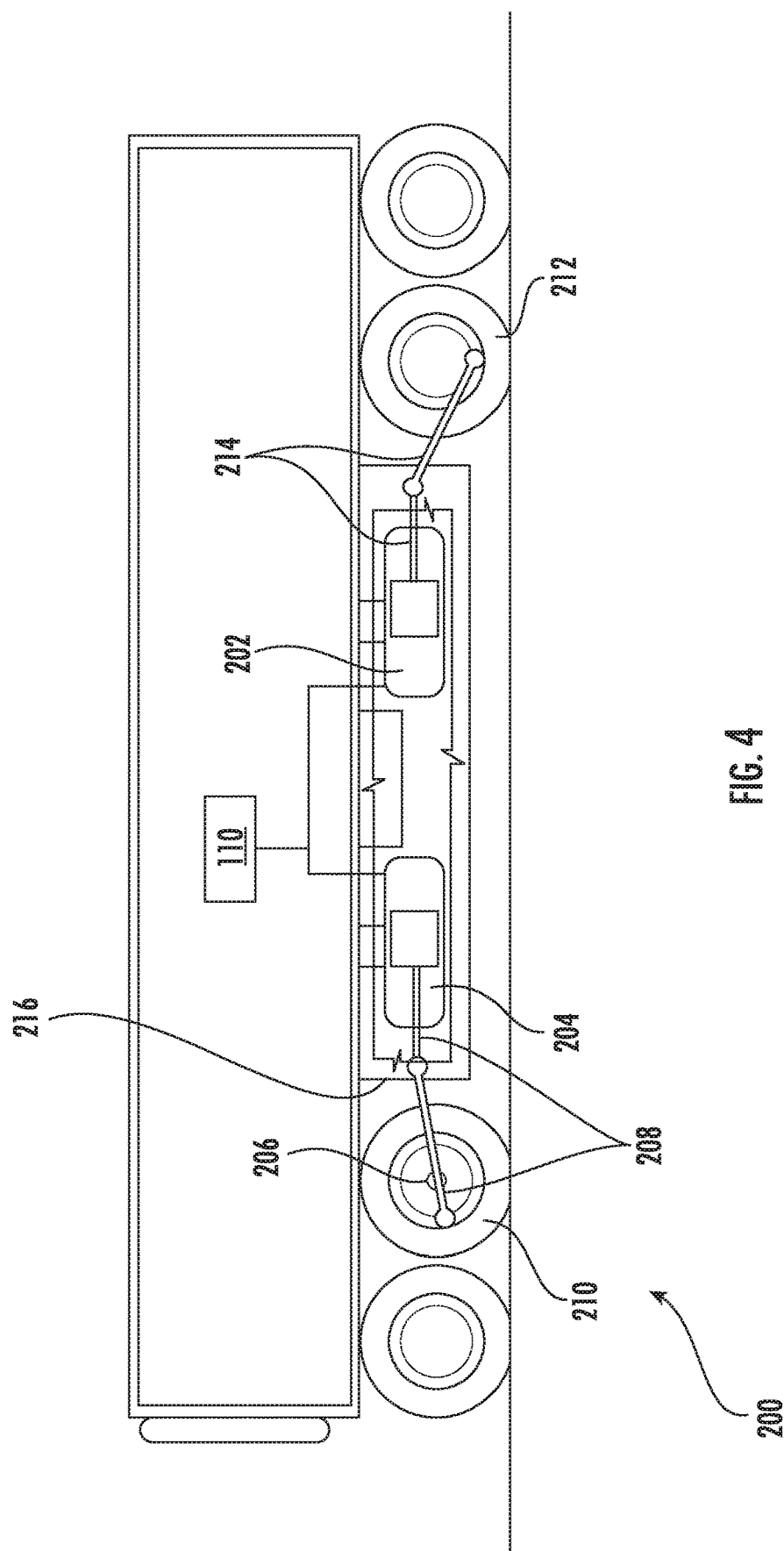
Figure 5:
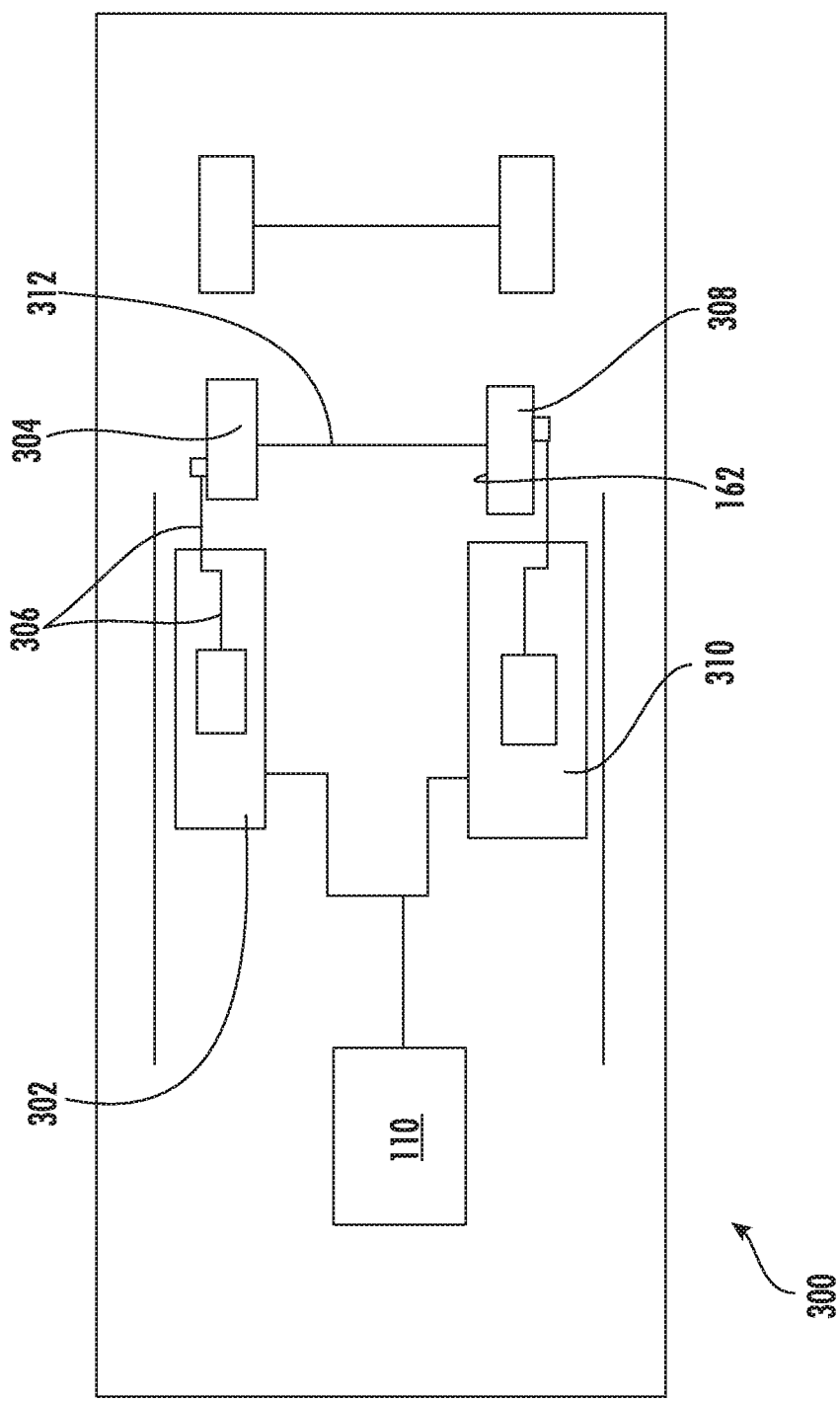

FIG. 4 is a side elevation view of the transport refrigeration system illustrated in FIG. 1 according to another embodiment, showing first and second linear generators individually connected to separate axles; and FIG. 5 is a schematic view of the transport refrigeration system illustrated in FIG. 1 according to yet another embodiment, showing first and second linear generators individually connected to a common axle.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a transportation refrigeration system in accordance with the disclosure is shown in FIG. 1 and is designated generally by reference character 100. Other embodiments of transportation refrigeration system and electric transportation refrigeration systems in accordance with the present disclosure, or aspects thereof, are provided in FIGS. 2-5, as will be described. The transportation refrigeration systems described in the present disclosure can be used to provide conditioning to conditioned spaces on vehicles, such as trucks and railcars, though the present disclosure is not limited to any vehicle type or to refrigeration systems in general.

Referring to FIG. 1, transport refrigeration system 100 is shown. Transport refrigeration system 100 includes a wheel 102, a linear generator 104, and a control circuit 106. Transport refrigeration system 100 also includes one or more battery 108, a refrigeration system component 110, and a conditioned space 112. The linear generator 104 is electrically connected to the refrigeration system component 110 and carried, for example, by a trailer box 10 (shown in FIG. 3). The linkage 142 is operably connected to the linear generator 104 to convert movement M of the transport refrigeration system 100 into electrical power P, which is communicated to refrigeration system component 110 for conditioning the environment within conditioned space 112.

Figure 2:
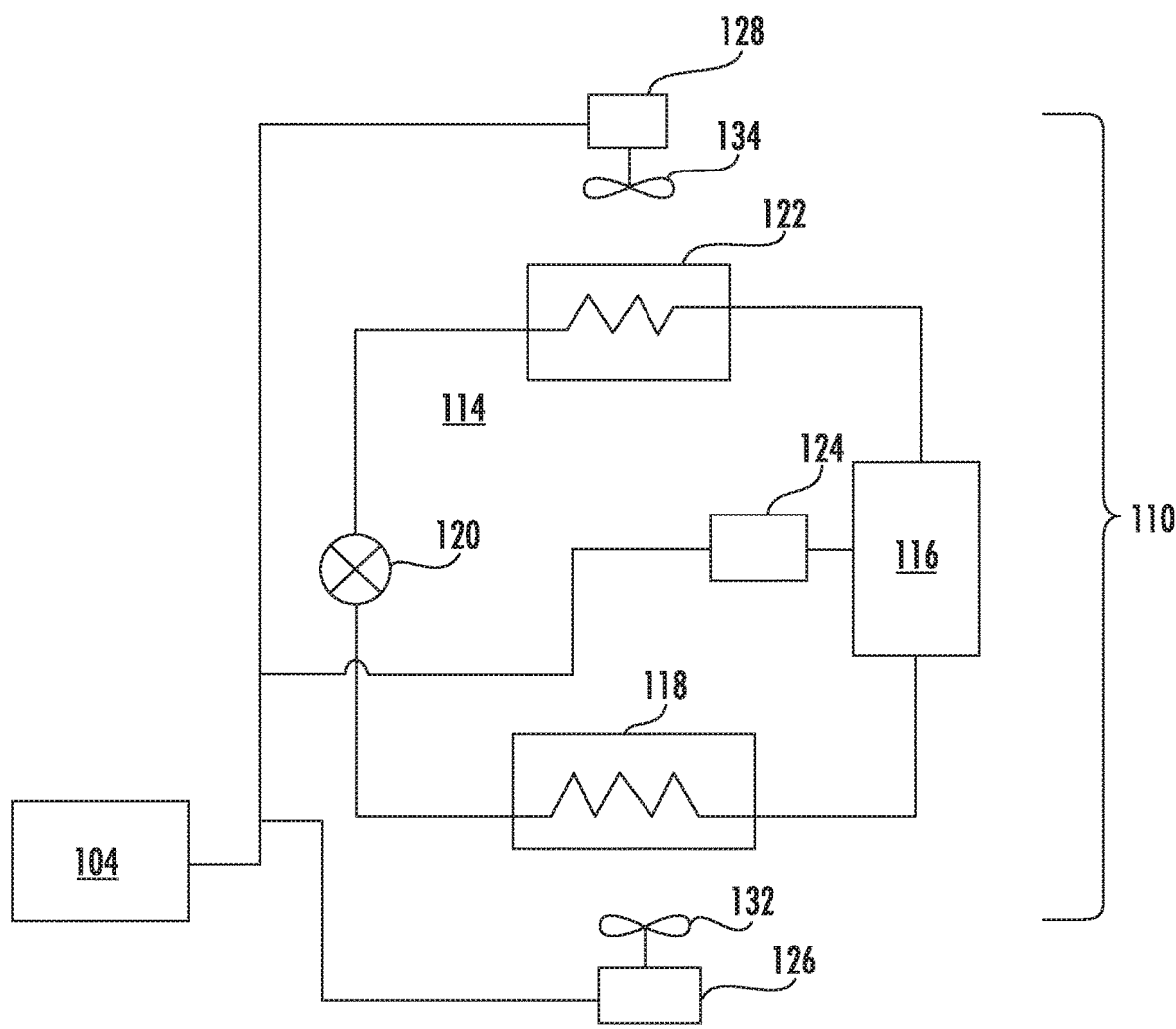
FIG. 2 is a schematic view of the refrigeration system component of the transport refrigeration system illustrated in FIG. 1, showing the refrigeration system component in a refrigeration circuit.

With reference to FIG. 2, the refrigeration system component 110 is a component of a refrigeration circuit 114 operating according to a refrigeration cycle. The refrigeration circuit 114 includes a compressor 116, a condenser 118, an expansion valve 120, and an evaporator 122 interconnected to one another by working fluid conduit segments. The linear generator 104 is electrically connected to one or more of a compressor motor 124, an evaporator fan motor 126, and a condenser fan motor 128. The compressor motor 124 is operatively connected to the compressor 116, the evaporator fan motor 126 is operatively connected to an evaporator fan 132, and the condenser fan motor 128 is operatively connected to a condenser fan 134. The condenser fan 134 and the evaporator fan 132 are in turn associated with the condenser 122 and the evaporator 118. Refrigeration circuit 114 can be as described in U.S. Patent Application No. 2011/0030399 A1, published Feb. 10, 2011, the contents of which are incorporated herein by reference in their entirety.

With continuing reference to FIG. 1, the control circuit 106 is electrically connected to the linear generator 104 and the refrigeration system component 110. It is contemplated that control circuit 106 be configured and adapted to convert electrical power provided by linear generator 104 into electrical power suitable for provision to refrigeration system component 110. For example, in certain embodiments control circuit 106 includes circuitry configured to convert variable frequency alternating current (AC) power into constant frequency AC power. In accordance with certain embodiments the control circuit 106 can be configured to convert power received from the linear generator 104 into direct current (DC) power.

The one or more battery 108 is electrically connected to the linear generator 104. In the illustrated embodiment the one or more battery 108 is electrically connected to the linear generator 104 through the control circuit 106, which converts power provided by the linear generator 104 into power suitable for charging the one or more battery 108 and converts power received from the one or more battery 108 into a form suitable for the refrigeration system component 110. In certain embodiments the one or more battery 108 includes a battery 134 carried by transport refrigeration system 100, such as in a trailer 146 (shown in FIG. 3). In accordance with certain embodiments the one or more battery 108 include a battery 138 carried by a prime mover 140, such as a tractor in a tractor-trailer arrangement, coupled to the transport refrigeration system 100.

Figure 3:
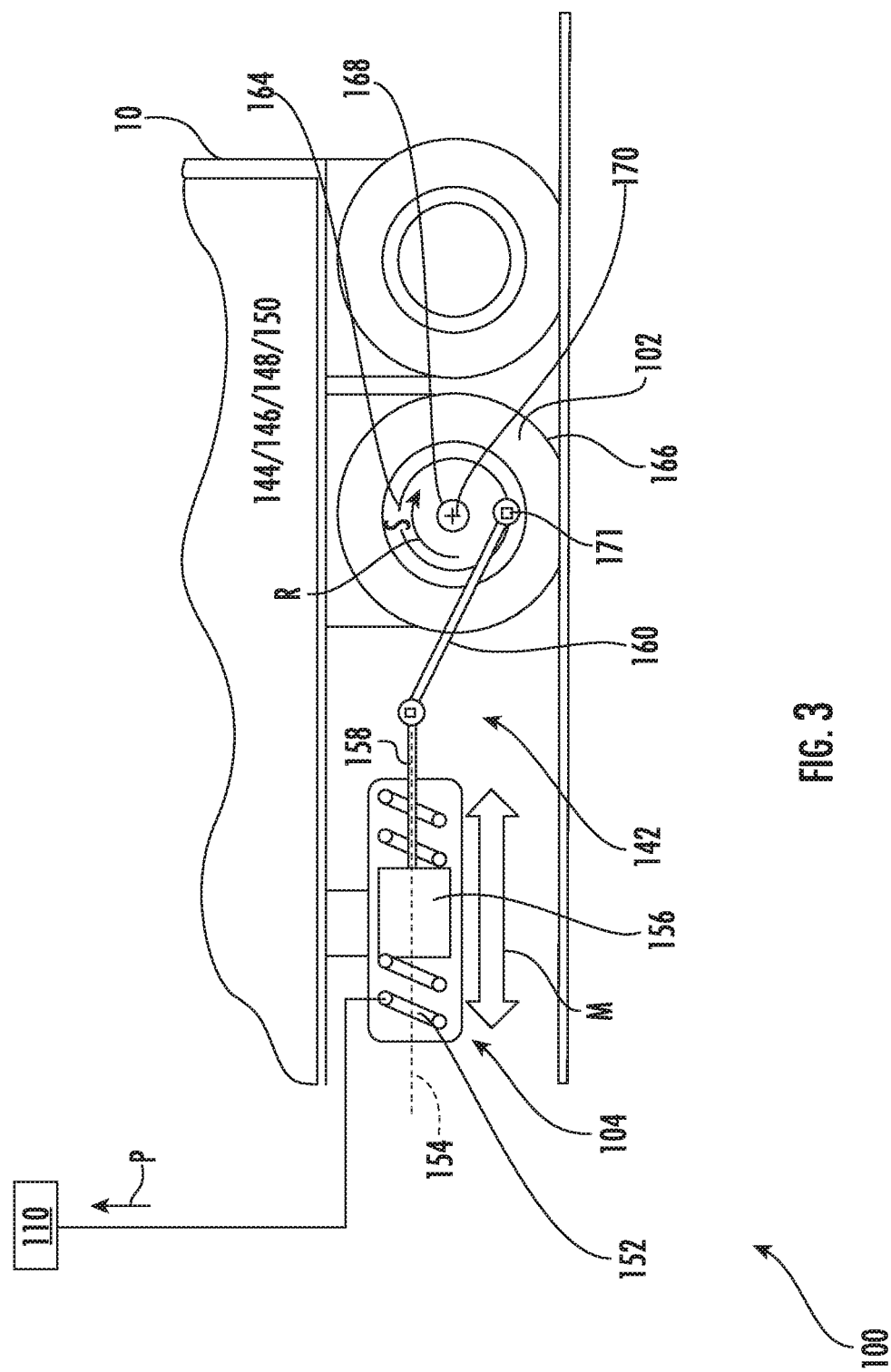
FIG. 3 is a schematic view of the linear generator and linkage of the transport refrigeration system illustrated in FIG. 1, showing a wheel supporting the transport refrigeration system and operably connected to the linear generator by the linkage to generate electrical power for the refrigeration system component.

With reference to FIG. 3, the linear generator 104 is shown. The linear generator 104 is carried by transport refrigeration system 100. In this respect the transport refrigeration system 100 can include a truck 144, a trailer 146, a railcar 148 or a shipping container 150 supported by the wheel 102 and that carries the linear generator 104. The linear generator 104 is electrically connected to the refrigeration system component 110 and is operatively associated with the wheel 102 through the linkage 142. In this respect the linear generator 104 includes a coil 152 extending about a reciprocation axis 154 and a permanent magnet 156. The permanent magnet 156 is disposed along the reciprocation axis 154 and is connected to the linage 142 for reciprocation along the reciprocation axis 154. As will be appreciated by those of skill in the art in view of the present disclosure, movement of the permanent magnet 156 along the reciprocation axis 154 induces a current flow in coil 152, which is communicated to the refrigeration system component 110 for powering the refrigeration system component 110.

The linkage 142 is operably connected to the linear generator 104 to convert movement M of the transport refrigeration system 100 into electrical power P (shown in FIG. 1) for communication to the refrigeration system component 110. In this respect the wheel 102 is supports the transport refrigeration system 100 and the linkage 142 is connected to the wheel 102 to generate the electrical power P using rotation R of the wheel 102. As shown in FIG. 3 linkage 142 includes a connecting link 158 and a drive link 160. The drive link 160 is fixed to the permanent magnet 156 reciprocates with the permanent magnet 156 along the reciprocation axis 154, i.e., with a cyclic linear stroke between first and second positions located along the reciprocation axis 154. The connecting link 158 connects the drive link 160 to the wheel 102, a reciprocating end of the connecting link 158 connected to the drive link 160 and opposite eccentric end of the connecting link 158 connected to the wheel 102.

The wheel 102 has an axle face 162 (shown in FIG. 5), an opposite road face 164, and a circumference 166. An axle 168 arranged about a rotation axis 170 couples the wheel 102 to the transport refrigeration system 100, the wheel 102 fixed in rotation relative to the axle 168 for rotation in concert with the axle 168 about the rotation axis 170, connection of the linkage 142 to the wheel 102 being such that rotation of the wheel 102 about rotation axis 170 (in association with movement M) generates electrical power P. In this respect the linkage 142, and more particularly the connecting link 158, is connected to the road face 164 of the wheel 102 at a location 171 arranged on a circumference radially offset from the rotation axis 170 between the rotation axis 170 the circumference 166 of the wheel 102. As will be appreciated by those of skill in the art in view of the present disclosure, connection of the linkage 142 to the road face 164 of wheel 102 simplifies the number of elements necessary for converting the rotation of the wheel 102 into reciprocation of the permanent magnet 156.

With reference to FIG. 4, a transport refrigeration system 200 is shown according to another embodiment. The transport refrigeration system 200 is similar to the transport refrigeration system 100 (shown in FIG. 1) and additionally includes a first linear generator 202 and a second linear generator 204. The first linear generator 202 and the second linear generator 204 are similar to the linear generator 104 (shown in FIG. 1) with the difference that the second linear generator 204 is connected to a separate axle 206. More particularly, the second linear generator 204 is operably associated with a second linkage 208. Second linkage 208 in turn connects the second linear generator 204 to a second wheel 210, which can rotate independently of a wheel 212 connected to the first linear generator 202 by a first linkage 214 is similar to linkage 142 (shown in FIG. 1), and which is fixed in rotation relative to the second axle 206. As will be appreciated by those of skill in the art in view of the present disclosure, second linear generator 204 provides additional electrical power for refrigeration system component 110 beyond that available from first linear generator 202.

As also shown in FIG. 4, the transport refrigeration system 200 includes a side guard 216. The side guard 216 is carried by the transport refrigeration system 200, extends vertically from the transport refrigeration system 200 and is laterally offset from the linear generators, e.g., from both the first linear generator 202 and the second linear generator 204. As will be appreciated by those of skill in the art, the side guard 216 provides protection to the first linear generator 202 and the second linear generator 204 as well as to other vehicles operating in proximity to the transport refrigeration system 200. As also shown in FIG. 4, the transport refrigeration system 200 can be engineless. In this respect the first linear generator 202 and/or the second linear generator 204 can have sufficient generating capability such that the kinetic energy associated with the movement of transport refrigeration system 200 is sufficient to power the refrigeration system component 110 without the need of an engine co-located (e.g., carried) by the transport refrigeration system 200.

With reference to FIG. 5, a transport refrigeration system 300 is shown. Transport refrigeration system 300 is similar to the transport refrigeration system 100 (shown in FIG. 1) and additionally includes a second linear generator 302. The second linear generator 302 is similar to the linear generator 104 (shown in FIG. 1) and is additionally operably associated with a wheel 304. More specifically, the wheel 304 is connected to the second linear generator 302 by a second linkage 306, which is similar to the linkage 142 (shown in FIG. 1). Notably, the wheel 308 and a wheel 304 operably connected to a first linear generator 310 and the second linear generator 302 respectively are on axle 312, which could be a dead axle, a differential axle, etc. As above, this increases the electrical power generation capability of transport refrigeration system 300 for providing electrical power to refrigeration system component 110.

The methods and systems of the present disclosure, as described above and shown in the drawings, provide for transportation refrigeration systems with superior properties including the capability to harvest kinetic energy by converting the motion of the transport refrigeration system into electrical energy using a linear generator. In certain embodiments the electrical energy can be stored in a battery for subsequent use by the transport refrigeration system. In accordance with certain embodiments the amount of fuel required to operate the transport refrigeration system can be reduced. While the apparatus and methods of the subject disclosure have been shown and described with reference to preferred embodiments, those skilled in the art will readily appreciate that changes and/or modifications may be made thereto without departing from the spirit and scope of the subject disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration system, comprising:
a refrigeration system component;
a linear generator electrically connected to the refrigeration system component;
a linkage operably connected to the linear generator to convert movement of the transportation refrigeration system into electrical power for communication to the refrigeration system component; and
a side guard carried by the transportation refrigeration system and laterally offset from the linear generator.

2. The transportation refrigeration system as recited in claim 1, further comprising a wheel supporting the transport refrigeration system, wherein the linkage is connected to the wheel to generate electrical power using rotation of the wheel.

3. The transportation refrigeration system as recited in claim 2, wherein the wheel has an axle face and a road face, wherein the linkage is connected to the road face of the wheel.

4. The transportation refrigeration system as recited in claim 3, wherein the linkage is connected to the road face of the wheel radially between a rotation axis of the axle and a circumference of the wheel.

5. The transportation refrigeration system as recited in claim 2, wherein the transportation refrigeration system comprises one of a truck, a trailer, a railcar, and a shipping container.

6. The transportation refrigeration system as recited in claim 1, wherein the linkage comprises a connecting link and a drive link.

7. The transportation refrigeration system as recited in claim 6, wherein the drive link is connected between the linear generator and the connecting link.

8. The transportation refrigeration system as recited in claim 6, wherein the connecting link is connected between the drive link and a wheel supporting the transportation refrigeration system.

9. The transportation refrigeration system as recited in claim 1, wherein the linear generator comprises:
a coil extending about a reciprocation axis and electrically connected to the refrigeration system component; and
a permanent magnet disposed along the reciprocation axis and connected to the linkage for reciprocation along the magnet axis.

10. The transportation refrigeration system as recited in claim 1, further comprising a battery electrically connected to the linear generator.

11. The transportation refrigeration system as recited in claim 10, wherein the battery is carried by the transportation refrigeration system.

12. The transportation refrigeration system as recited in claim 10, wherein the battery is carried by a prime mover coupled to the transportation refrigeration system.

13. The transportation refrigeration system as recited in claim 10, further comprising a control circuit arranged to electrically connect linear generator to either or both the refrigeration system component and the battery.

14. The transportation refrigeration system recited in claim 1, wherein the side guard is operable to protect the linear generator.

15. The transportation refrigeration system as recited in claim 1, wherein the refrigeration system component comprises at least one of a compressor, an evaporator fan, and a condenser fan.

16. The transportation refrigeration system as recited in claim 1, wherein linear generator is a first linear generator and further comprising a second linear generator electrically connected to the refrigeration system component.

17. The transportation refrigeration system as recited in claim 16, wherein the first linear generator and the second linear generator are individually connected by separate linkages to a common axle.

18. The transportation refrigeration system as recited in claim 16, wherein the first linear generator and the second linear generator are individually connected by separate linkages to separate axles.

19. The transportation refrigeration system as recited in claim 1, wherein the transportation refrigeration system is engineless.

20. An electric transportation refrigeration system used to cool a trailer box, comprising:
a transportation refrigeration system as recited in claim 1, wherein the linkage comprises a connecting link and a drive link, wherein the linear generator comprises:
a coil extending about a reciprocation axis and electrically connected to the refrigeration system component; and
a permanent magnet disposed along the reciprocation axis and connected to the drive link for reciprocation along the reciprocation axis;
a wheel supporting the transport refrigeration system and connected to the linear generator by the connecting link to generate electrical power using rotation of the wheel; and
a battery electrically connected to the linear generator.

* * * * *